(12) United States Patent
Army et al.

(10) Patent No.: US 10,124,452 B2
(45) Date of Patent: Nov. 13, 2018

(54) COLD CORNER FLOW BAFFLE

(71) Applicant: HAMILTON SUNDSTRAND CORPORATION, Windsor Locks, CT (US)

(72) Inventors: Donald E. Army, Enfield, CT (US); Louis J. Bruno, Ellington, CT (US); Erin G. Kline, Vernon, CT (US); Anthony DeLugan, Windsor Locks, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 269 days.

(21) Appl. No.: 14/996,459

(22) Filed: Jan. 15, 2016

(65) Prior Publication Data

US 2016/0131431 A1    May 12, 2016

Related U.S. Application Data

(63) Continuation-in-part of application No. 14/299,703, filed on Jun. 9, 2014.

(60) Provisional application No. 61/864,255, filed on Aug. 9, 2013.

(51) Int. Cl.
  *B23P 15/26* (2006.01)
  *F28F 9/02* (2006.01)
  *F28D 9/00* (2006.01)
  *B64D 13/00* (2006.01)

(52) U.S. Cl.
  CPC ............. *B23P 15/26* (2013.01); *B64D 13/00* (2013.01); *F28D 9/0068* (2013.01); *F28F 9/0214* (2013.01); *F28F 2265/00* (2013.01)

(58) Field of Classification Search
  CPC ....... B23P 15/26; B64D 13/00; F28D 9/0068; F28D 9/0214; F28F 9/0068; F28F 9/0214; F28F 2265/00; F28F 9/0202
  USPC ............................................. 165/164
  See application file for complete search history.

(56) References Cited

U.S. PATENT DOCUMENTS

| | | | | | |
|---|---|---|---|---|---|
| 2,566,310 | A | * | 9/1951 | Burns | F25J 5/002 165/140 |
| 5,107,926 | A | * | 4/1992 | Calleson | F28D 1/05383 165/153 |
| 5,152,339 | A | * | 10/1992 | Calleson | F28D 1/05391 165/173 |

(Continued)

FOREIGN PATENT DOCUMENTS

| DE | 2753496 A1 | 6/1979 |
|---|---|---|
| DE | 19636018 A1 | 3/1998 |

(Continued)

OTHER PUBLICATIONS

European Search Report, European Application No. 16198865.4, dated Jun. 1, 2017, European Patent Office; European Search Report 8 pages.

*Primary Examiner* — Raheena R Malik
(74) *Attorney, Agent, or Firm* — Cantor Colburn LLP

(57) ABSTRACT

A heat exchanger for an aircraft includes a hot fluid inlet, a hot fluid outlet, a cold fluid inlet, a cold fluid outlet, and a header connected to the hot fluid outlet. The header includes a housing defining a header volume and a baffle separating the header volume into a first volume and a second volume, wherein the first volume and the second volume are in fluid communication with each other.

10 Claims, 7 Drawing Sheets

(56) References Cited

U.S. PATENT DOCUMENTS

| | | | | |
|---|---|---|---|---|
| 5,333,683 | A | * | 8/1994 | Arriulou ............ F25J 3/04412 |
| | | | | 165/166 |
| 5,816,315 | A | | 10/1998 | Stark |
| 6,155,340 | A | | 12/2000 | Folkedal et al. |
| 6,161,614 | A | | 12/2000 | Woodhull et al. |
| 7,775,264 | B2 | | 8/2010 | Andersson et al. |
| 2002/0152765 | A1 | | 10/2002 | Sauterleute et al. |
| 2008/0314569 | A1 | * | 12/2008 | Yamazaki ........ F02M 37/0029 |
| | | | | 165/153 |
| 2012/0255715 | A1 | | 10/2012 | Army et al. |
| 2015/0041108 | A1 | | 2/2015 | Gold |
| 2015/0136366 | A1 | * | 5/2015 | Fukui ..................... F28F 13/06 |
| | | | | 165/148 |
| 2015/0276331 | A1 | | 10/2015 | DeLugan et al. |
| 2015/0314666 | A1 | | 11/2015 | Lukens et al. |
| 2016/0001256 | A1 | * | 1/2016 | Fujita ..................... F28F 1/30 |
| | | | | 422/198 |

FOREIGN PATENT DOCUMENTS

| | | |
|---|---|---|
| EP | 0212878 A1 | 3/1987 |
| EP | 0802380 | 10/1997 |
| GB | 681144 | 10/1952 |
| WO | 2008107656 A1 | 9/2008 |
| WO | 2010107881 A1 | 9/2010 |

\* cited by examiner

COLD CORNER FLOW BAFFLE

CROSS-REFERENCE TO RELATED APPLICATION(S)

This application is a continuation-in-part application of legally related application U.S. Ser. No. 14/299,703 filed Jun. 9, 2014, and claims priority from U.S. Provisional Application Ser. No. 61/864,255, filed Aug. 9, 2013, the contents of which are incorporated by reference herein in their entireties.

STATEMENT OF GOVERNMENT INTEREST

This invention was made with government support under Contract No. N00019-06-C-0081 awarded by the United States Navy. The government has certain rights in the invention.

BACKGROUND OF THE INVENTION

The subject matter disclosed herein generally relates to heat exchangers and, more particularly, to heat exchangers having an airflow divider in a header of the heat exchanger.

Aircraft may use bleed air from an engine and/or ram air obtained from outside the aircraft as a source of air for aircraft compartments, harnessed by environmental control systems which may include air cycle machines. Bleed air may be routed to an environment control system which conditions the bleed air, generates low pressure cold air, and controls the cooling of avionics, heating, cooling and pressurization of an occupied compartment. Because the temperature and pressure of the bleed air as extracted from the engine may be too high for the use directly by the environmental control system, the temperature and pressure of the bleed air may be lowered. For example, heat exchangers may be used to provide thermal air conditioning to the bleed air by crossing the bleed air through an exchanger that uses ram air for cooling the bleed air.

BRIEF DESCRIPTION OF THE INVENTION

According to one embodiment, a heat exchanger for an aircraft is provided. The heat exchanger includes a hot fluid inlet, a hot fluid outlet, a cold fluid inlet, a cold fluid outlet, and a header connected to the hot fluid outlet. The header includes a housing defining a header volume and a baffle separating the header volume into a first volume and a second volume, wherein the first volume and the second volume are in fluid communication with each other.

According to another embodiment, a method making of a heat exchanger for an aircraft is provided. The method includes connecting a header to a heat exchanger having a hot fluid inlet, a hot fluid outlet, a cold fluid inlet, and a cold fluid outlet, the header connected to the hot fluid outlet. The header includes a housing defining a header volume and a baffle separating the header volume into a first volume and a second volume, wherein the first volume and the second volume are in fluid communication with each other.

Technical effects of embodiments of the invention include an airflow divider provided in a header of a heat exchanger configured to divide a header volume into a first volume and a second volume. Further technical effects include extracting a portion of air in a header volume and diverting the air to an occupied compartment, e.g., bypassing an air cycle machine. Further technical effects include controlling header air extraction through a bypass flow path with a bypass valve.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

The header described in the following figures is split into two cavities by a baffle. The baffle is arranged at the hot fluid outlet of a heat exchanger such that a temperature differential exists between the two cavities. An On-Board Inert Gas Generation System (OBIGGS) is connected to the cooler of the two cavities, and a primary outlet is connected to the warmer cavity. A slot in the baffle allows fluid flow from the cooler cavity in the event that the OBIGGS system is shut off, or when the heat exchanger is passing more air to the cooler cavity than is required by the OBIGGS.

Figure 1:
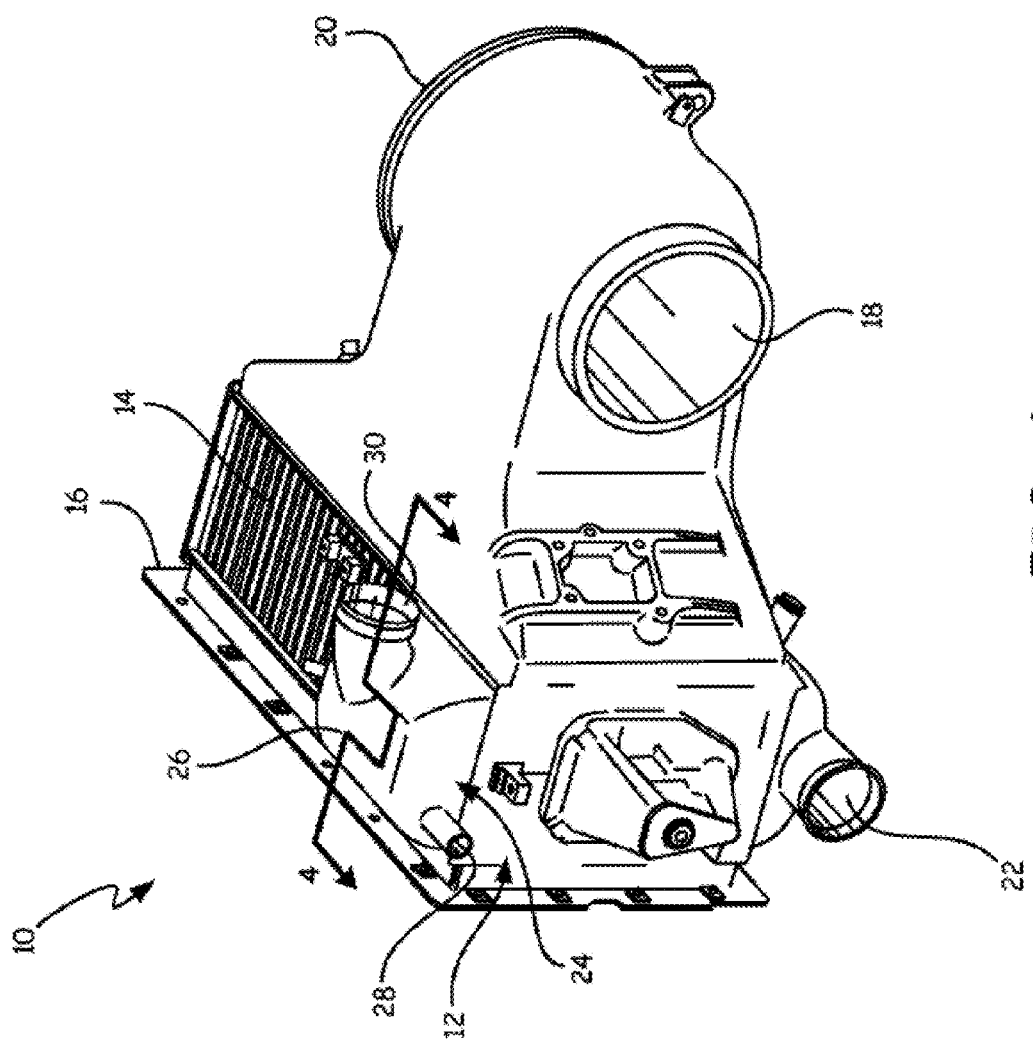
FIG. 1 is a perspective view of a dual heat exchanger with a header.

FIG. 1 is a perspective view of dual heat exchange component 10. Dual heat exchange component 10 includes primary heat exchanger 12, secondary heat exchanger 14, ram inlet flange 16, ram exhaust outlet 18, and air cycle machine fan outlet 20. Primary heat exchanger 12 includes primary bleed inlet 22 and header 24. Header 24 includes housing 26, OBIGGS outlet 28, and primary heat exchanger outlet 30.

Dual heat exchange component 10 is a part of an air handling system used in conjunction with a gas turbine engine (not shown). Primary heat exchanger 12 and secondary heat exchanger 14 are used to transfer heat from working fluids in the gas turbine engine to relatively cooler ram air. Ram inlet flange 16 is used to attach primary heat exchanger 12 and secondary heat exchanger 14 to an inlet particle separator (not shown), which receives ram air from outside the gas turbine engine, for example at a ram air scoop. The ram air received in this way is used as the cooling air flow in primary heat exchanger 12 and secondary heat exchanger 14.

Ram exhaust outlet 18 and air cycle machine fan outlet 20 are parts of heat exchange systems related to primary heat exchanger 12 and secondary heat exchanger 14. The availability of ram air is typically related to the air velocity of an aircraft, for example by way of a ram air scoop. Ram exhaust outlet 18 is coupled with a ram air fan (not shown), and is used to provide fluid flow across primary heat exchanger 12 and secondary heat exchanger 14. A ram air fan may be used to draw air through primary heat exchanger 12 when ram air is not available, for example when the aircraft is on the ground.

Air cycle machine fan outlet 20 is coupled with the fan section of an air cycle machine (not shown). An air cycle machine may be used to condition air for use in the environmental control system of an aircraft associated with the gas turbine engine. Air passing through air cycle machine fan outlet 20 may be cooled in secondary heat exchanger 14 before being routed to the cabin of the aircraft.

Primary bleed inlet 22 is positioned to route bleed air from the bleed valve of the associated gas turbine engine to primary heat exchanger 12. Bleed air of an operating gas turbine engine is much hotter than ram air due to compression and shear heating upstream of the bleed valve. For example, bleed air may be between 250° C. or higher, whereas ram air is substantially the same temperature as ambient conditions, often between 55 and 50° C. Primary heat exchanger 12 is used to transfer heat from air supplied via primary bleed inlet 22 to ram air.

Bleed air that has been cooled is routed out of primary heat exchanger 12 to header 24. Header 24 is positioned at hot fluid outlet 48 (FIG. 2) and receives the cooled bleed air. Housing 26 is attached to primary heat exchanger 12, and OBIGGS outlet 28 is defined in housing 26 to provide cooled bleed air to the OBIGGS. Primary heat exchange outlet 30 is also defined in housing 26, and provides cooled bleed air to other components of the gas turbine engine.

Because OBIGGS outlet 28 and primary heat exchange outlet 30 route cooled bleed air to different destinations, the desired temperature of cooled bleed air routed to OBIGGS outlet 28 may be different from the desired temperature of cooled bleed air routed to primary heat exchange outlet 30. In the embodiment shown in FIG. 1, OBIGGS outlet 28 is configured to deliver fluid at 99° C. or lower to an attached OBIGGS system (not shown).

Figure 2:
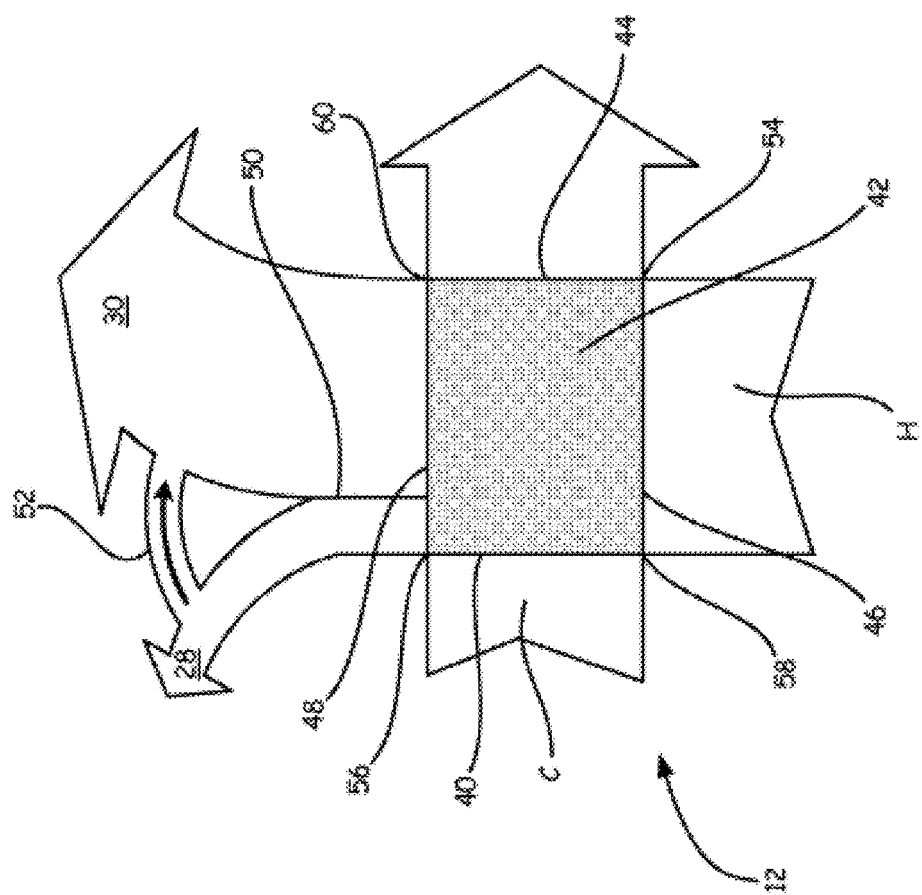
FIG. 2 is a schematic view of a cross-flow heat exchanger having a baffle.

FIG. 2 is a schematic view of the fluid flow paths of cold air flow C and hot air flow H through primary heat exchanger 12 of FIG. 1. FIG. 2 illustrates the flow paths of these two separate fluid circuits through many of the components previously listed with reference to FIG. 1.

As shown in FIG. 2, cold fluid C (such as ram air) is routed sequentially through cold fluid inlet 40, heat exchange region 42, and cold fluid outlet 44. Hot fluid H (such as fluid from a bleed valve of a gas turbine engine) is routed sequentially through hot fluid inlet 46, heat exchange region 42, and hot fluid outlet 48. Baffle 50 diverts cooled hot fluid within header 24 to OBIGGS outlet 28 or primary heat exchanger outlet 30. Alternate flow path 52 allows some fluid flow from OBIGGS outlet 28 to primary heat exchange outlet 30, as indicated by the arrow.

Heat exchanger region 42 facilitates heat transfer from the hot fluid to the cold fluid without intermixing the two fluids. Heat exchange region 42 is a cross-flow arrangement, in which hot fluid and cold fluid are routed between adjacent, parallel plates (not shown). As hot fluid crosses heat exchange region 42 from hot fluid inlet 46 to hot fluid outlet 48 it is cooled by conductive heat transfer through the plates. Likewise, as cold fluid crosses heat exchange region 42 from cold fluid inlet 40 to cold fluid outlet 44 it is warmed. Thus, the hottest corner of heat exchange region 42 is found at the corner adjacent to hot fluid inlet 46 and cold fluid outlet 44. This corner is known as hot-hot corner 54. Likewise, the coldest corner of heat exchanger region 42 is found at the corner adjacent to hot fluid outlet 48 and cold fluid inlet 40. This corner is known as cold-cold corner 56. The corner adjacent to hot fluid inlet 46 and cold fluid inlet 40 is hot-cold corner 58, and the corner adjacent to hot fluid outlet 48 and cold fluid outlet 44 is cold-hot corner 60.

Baffle 50 separates cooled hot fluid flow H at hot fluid outlet 48 such that the portion of hot fluid flow H closest to cold-cold corner 56 is routed to OBIGGS outlet 28, and the remainder of cooled hot fluid flow H at hot fluid outlet 48 is routed to primary heat exchanger outlet 30. Because of the cross-fluid flow and temperature gradient from cold-cold corner 56 to cold-hot corner 60, hot fluid flow H routed to OBIGGS outlet 28 by baffle 50 is relatively colder than cooled hot fluid flow H routed to primary heat exchanger outlet 30.

Alternate flow path 52 is positioned to allow fluid communication from OBIGGS outlet 28 to primary heat exchanger outlet 30. This may be desirable in situations where the OBIGGS does not require as much fluid as is provided to OBIGGS outlet 28, such as when the OBIGGS is shut off. As indicated by the arrow, fluid flow through alternate flow path 52 is unidirectional.

Figure 3:
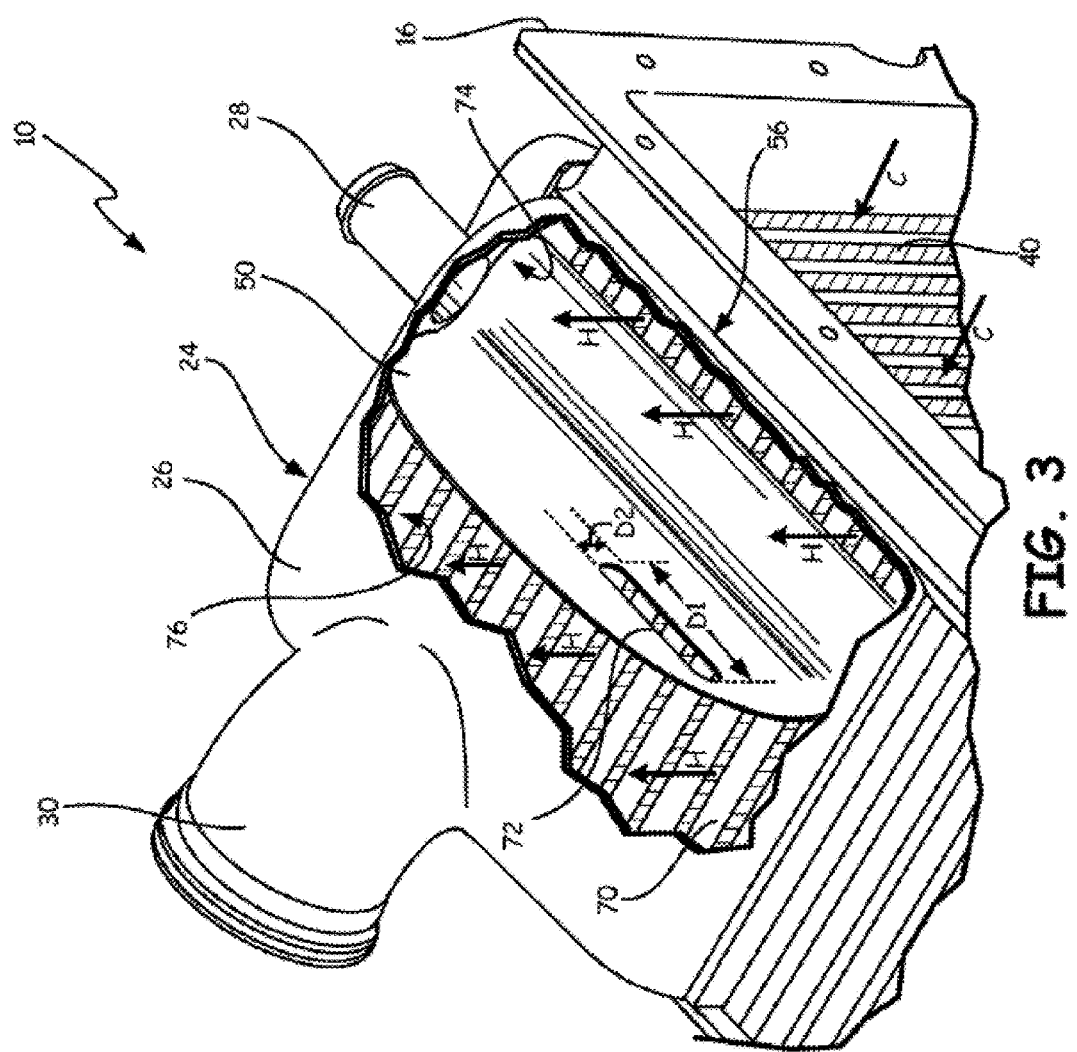
FIG. 3 is a perspective view of the header of FIG. 1, with a portion broken away to show a baffle.

FIG. 3 shows dual heat exchanger 10, including primary heat exchanger 12, ram inlet flange 16, and header 24. As seen in FIG. 3, cold air flow C entering cold fluid inlet 40 is visible, as is hot fluid flow H exiting hot fluid outlet 48 of primary heat exchanger 12. The corner at which cold fluid inlet 40 and hot fluid outlet 48 intersect is cold-cold corner 56, as described previously with respect to FIG. 2. FIG. 3 also shows header 24, including housing 26, OBIGGS outlet 28, and primary heat exchange outlet 30. As shown in FIG. 3, housing 26 is partially cut away to show baffle 50 and closure bars 70 of the cold fluid circuit, which block cold fluid flow C from entering first cavity 74 and second cavity 76. Baffle 50 defines an aperture, slot 72.

Baffle 50 is shaped to split hot fluid flow H exiting hot fluid outlet 48. The portion of hot fluid flow H exiting hot fluid outlet 48 closest to cold-cold corner 56 is diverted to first cavity 74. The remainder of hot fluid flow H exiting hot fluid outlet 48 is routed to second cavity 76. Slot 72 allows fluid flow from first cavity 74 to second cavity 76. OBIGGS outlet 28 is positioned to receive fluid from first cavity 74, whereas primary heat exchange outlet 30 is positioned to receive fluid from second cavity 76.

Baffle 50 includes slot 72, which is an aperture positioned within baffle 50 to allow fluid flow from first cavity 74 to second cavity 76. Slot 72 is configured to be small enough to maintain a level of thermal separation between first cavity 74 and second cavity 76. If slot 72 is too large, heat may be convectively transferred from second cavity 76 to first cavity 74, warming the fluid within first cavity 74 and exceeding a desired temperature therein. Conversely, slot 72 is configured to be large enough to permit flow from first cavity 74 to second cavity 76 when fluid ingress to first cavity 74 from hot fluid flow H exceeds fluid egress to OBIGGS outlet 28. Slot 72 is defined by slot width D1 and slot height D2. In the embodiment shown in FIG. 3, slot 72 is a rectangular aperture with rounded corners. In particular, in the embodiment shown in FIG. 3, slot width D1 is between 6.9 and 7.0 cm, and slot height D2 is between 1.2 and 1.3 cm.

In alternative embodiments, slot 72 may be irregularly shaped or positioned elsewhere on baffle 50. Alternate geometries, sizes, and positions are possible that permit sufficient flow from first cavity 74 to second cavity 76 while maintaining a desired level of thermal separation therebetween.

Because first cavity 74 is positioned to receive hot fluid flow H from the portion of heat exchanger 12 closest to cold-cold corner 56, the portion of hot fluid flow H routed to first cavity 74 by baffle 50 is cooler than the portion of hot fluid flow H routed to second cavity 76 by baffle 50. Additionally, because OBIGGS outlet 28 is positioned to receive fluid from first cavity 74 and primary heat exchange outlet 30 is positioned to receive fluid from second cavity 76, the fluid transferred to OBIGGS outlet 28 is cooler than the fluid transferred to primary heat exchange outlet 30.

Baffle 50 may route more of cooled hot fluid flow H to first cavity 74 than is routed through OBIGGS outlet 28. Thus, some air may be routed through slot 72 from first cavity 74 to second cavity 76.

Figure 4:
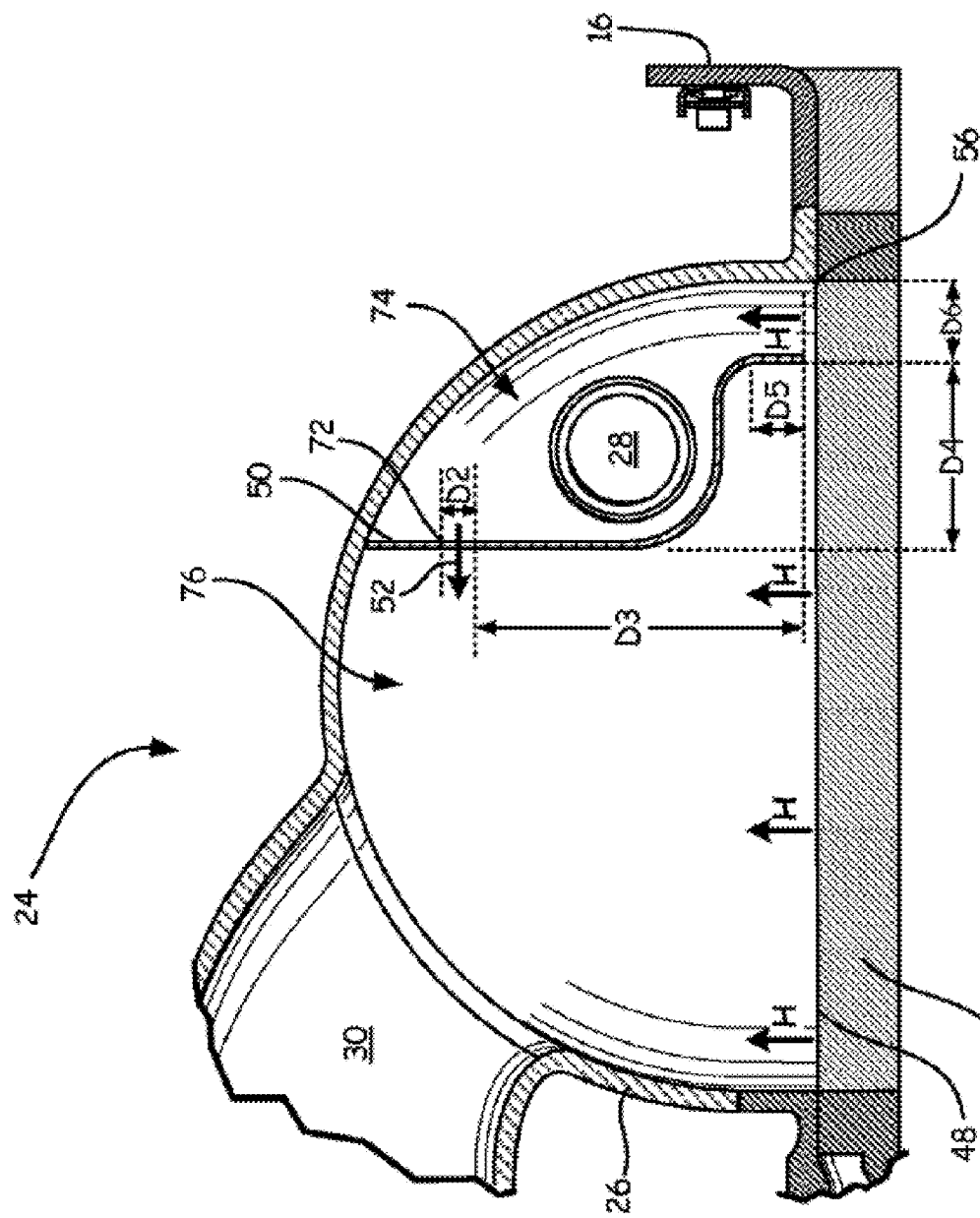
FIG. 4 is a cross-sectional view of the header of FIG. 1 along line 4-4.

FIG. 4 is a cross-sectional view of header 24 along line 4-4 of FIG. 1. Hot fluid flow H is shown entering first cavity 74 and second cavity 76 between heat exchanger 12 and housing 26. Baffle 50 separates first cavity 74 from second cavity 76. The hot fluid flow H closest to cold-cold corner 56 is routed to first cavity 74 by baffle 50. FIG. 4 further illustrates various dimensions of baffle 50, including slot height D2, slot clearance D3, offset length D4, offset height D5, and aperture width D6.

First cavity 74 feeds OBIGGS outlet 28, second cavity 76 feeds primary heat exchange outlet 30, and slot 72 allows for fluid flow along alternate flow path 52 through baffle 50. Slot 72 defines slot height D2, as previously described with respect to FIG. 3. Slot clearance D3 is the distance between the lowest edge of baffle 50 defined by dimension D5 and the lower boundary of slot 72. The lowest edge of baffle 50 is typically spaced from hot fluid outlet 48 by a small offset. In the embodiment shown in FIG. 4, this offset is less than 0.64 cm. Slot clearance D3 is configured to position slot 72 to maintain a desired air flow pattern during operation. By positioning slot 72 further from cold-cold corner 56 than OBIGGS outlet 28, the temperature of hot air flow H that is routed to OBIGGS outlet 28 in normal operating conditions is reduced. In the embodiment shown in FIG. 4, slot clearance D3 is between 5.2 and 5.3 cm.

Offset length D4 is the length of a jog in baffle 50. Offset length D4 is configured to define the relative sizes of first cavity 74 and second cavity 76. Offset length D4 positions baffle 50 in proximity to cold-cold corner 56 while also positioning OBIGGS outlet 28 to be fed by first cavity 74. In the embodiment shown in FIG. 4, offset length D4 is between 4.0 and 4.2 cm.

Offset height D5 is the distance along baffle 50 from its closest point to hot fluid outlet 48 to the beginning of the jog defined by offset length D4. Offset height D5 is also configured to define the relative sizes of first cavity 74 and second cavity 76. Offset height D5 positions baffle 50 such that OBIGGS outlet 28 is fed by first cavity 74. In the embodiment shown in FIG. 4, offset height D5 is between 0.8 and 0.9 cm.

Baffle 50 is separated from cold-cold corner 56 by an aperture width D6. Aperture width D6 defines the quantity of hot fluid flow H that is routed to first cavity 74. If aperture width D6 were to be enlarged, the portion of hot fluid flow H routed to first cavity 74 would become warmer. If aperture width D6 is sufficiently enlarged, the temperature of the portion of hot fluid flow H routed to first cavity 74 may exceed a desired threshold for fluid routed to OBIGGS outlet 28, which is fed by first cavity 74.

Conversely, if aperture width D6 were to be narrowed, the portion of hot fluid flow H routed to first cavity 74 would become cooler. However, with sufficiently narrow aperture width D6, fluid ingress to first cavity 74 may become too low to supply OBIGGS outlet 28. In that case, fluid flow direction across slot 72 (FIG. 3) may become reversed, and fluid would travel from second cavity 76 to first cavity 74, in the opposite direction of alternate flow path 52. Because the portion of hot fluid flow H directed to second cavity 76 has been routed through a portion of hot fluid outlet 48 that is distant from cold-cold corner 56, the result of narrowing aperture width D6 may also be increasing the temperature of fluid positioned in first cavity 74 above a predetermined threshold for fluid routed to OBIGGS outlet 28. In the embodiment shown in FIG. 4, aperture width D6 is between 1.5 and 1.6 cm.

The characteristics of fluid flow between first cavity 74 and second cavity 76 via alternate flow path 52 are set by the relative sizes of slot width D1 (FIG. 3) and slot height D2. The relative size and positions of first cavity 74 and second cavity 76 are defined by slot clearance D3, offset length D4, offset height D5, and aperture width D6.

The following are non-exclusive descriptions of possible embodiments of the present disclosure.

A heat exchanger includes a hot fluid inlet, a hot fluid outlet, a cold fluid inlet, and a cold fluid outlet. The heat exchanger also has a header connected to the hot fluid outlet. The header includes a housing and a baffle separating a first cavity from a second cavity within the housing. An On-Board Inert Gas Generation System (OBIGGS) outlet is defined by the housing adjacent to the first cavity. A primary outlet is defined by the housing adjacent to the second cavity.

The heat exchanger of the preceding paragraph can optionally include, additionally and/or alternatively, any one or more of the following features, configurations and/or additional components:

The baffle may define a slot such that the first fluid positioned in the first cavity is in fluid communication with a second fluid positioned in the second cavity via an alternate flow path. The heat exchanger may be a cross-flow heat exchanger. The first cavity may be arranged adjacent to a cold-cold corner. An aperture width between the baffle and the cold-corner may be between 1.5 and 1.6 cm. The OBIGGS outlet may be positioned to receive a fluid from the first cavity that has a temperature of less than 99° C. The heat exchanger may be a primary heat exchanger of a dual heat exchange system.

In another embodiment, a heat exchange system includes a cold fluid circuit for routing a cold fluid sequentially through a ram air inlet, a cold fluid inlet of a heat exchanger, and a cold fluid outlet of the heat exchanger. A hot fluid circuit for routing a hot fluid includes a bleed air valve, a hot fluid inlet of the heat exchanger, a hot fluid outlet of the heat exchanger, and a header. The header includes a first cavity and a second cavity defined within a housing and separated by a baffle.

The heat exchange system of the preceding paragraph can optionally include, additionally and/or alternatively, any one or more of the following features, configurations and/or additional components:

The heat exchanger may be configured to transfer heat from the hot fluid to the cold fluid. The heat exchanger may be a cross-flow heat exchanger. The first cavity may be configured to receive the hot fluid routed between the baffle and the cold-cold corner. The aperture width between the baffle and the cold-cold corner may be between 1.5 and 1.6 cm. The baffle may include a slot. The heat exchange system may also include an alternate flow path from the first cavity to the second cavity via the slot.

In another embodiment, a method includes routing a hot fluid from a bleed valve to a hot fluid inlet of a heat exchanger. Hot fluid is routed from the heat exchanger to a hot fluid outlet to cool the hot fluid. The hot fluid is separated at the hot fluid outlet into a first cavity and a second cavity. The hot fluid is routed from the first cavity to an OBIGGS system, and from the second cavity to a compressor.

The method of the preceding paragraph can optionally include, additionally and/or alternatively, any one or more of the following steps, features, configurations and/or additional components:

The heat exchanger may be a cross-flow heat exchanger. The first cavity and the second cavity may be separated by a baffle. The baffle may be arranged between 1.5 cm and 1.6 cm from the cold-cold corner. The method may also include diverting the hot fluid from the hot fluid outlet within an aperture width of the cold-cold corner to the first cavity, and diverting the hot fluid from the hot fluid outlet that is not within an aperture width of the cold-cold corner of the second cavity. The method may also include comprising routing the hot fluid from the first cavity to the second cavity via an alternate flow path.

In operation of an aircraft, high-pressure high-temperature air from either the engine or the APU may enter the primary heat exchanger and is cooled by ram air, as described above. This warm, high pressure air may then enter an air cycle machine centrifugal compressor. The compressor pressurizes the air and in the process heats it. The air then enters the secondary heat exchanger and is cooled by ram air to approximately ambient temperature. This cool, high pressure air may enter a high pressure water separator where the air goes through a reheater and is cooled; through a condenser, where it is cooled by air from the ACM turbine; through a water extractor, where the moisture in the air is removed; and through the reheater, where the air is heated back to nearly the same temperature it started at when it entered the high pressure water separator. The warm, high pressure and now dry air enters a turbine, where it is expanded and work may be extracted. The work from the turbine drives both the before mentioned compressor and a fan that is used to force ram air flow through the primary and secondary heat exchangers. After leaving the turbine, the cold air, typically below freezing, cools the warm moist air in a condenser. After the air leaves the condenser, it is mixed with recirculated air and then sent to condition cabin and flight deck air.

In accordance with various embodiments provided herein, during a hot day, ground operation the air cycle machine compressor may receive nearly all of the air flow through the system. However, during standard day cruise operation the air cycle machine compressor may receive only a portion of the air flow. The remainder of the air may bypass the compressor via a bypass outlet and bypass valve and the air is sent to the cabin.

Figure 5A:
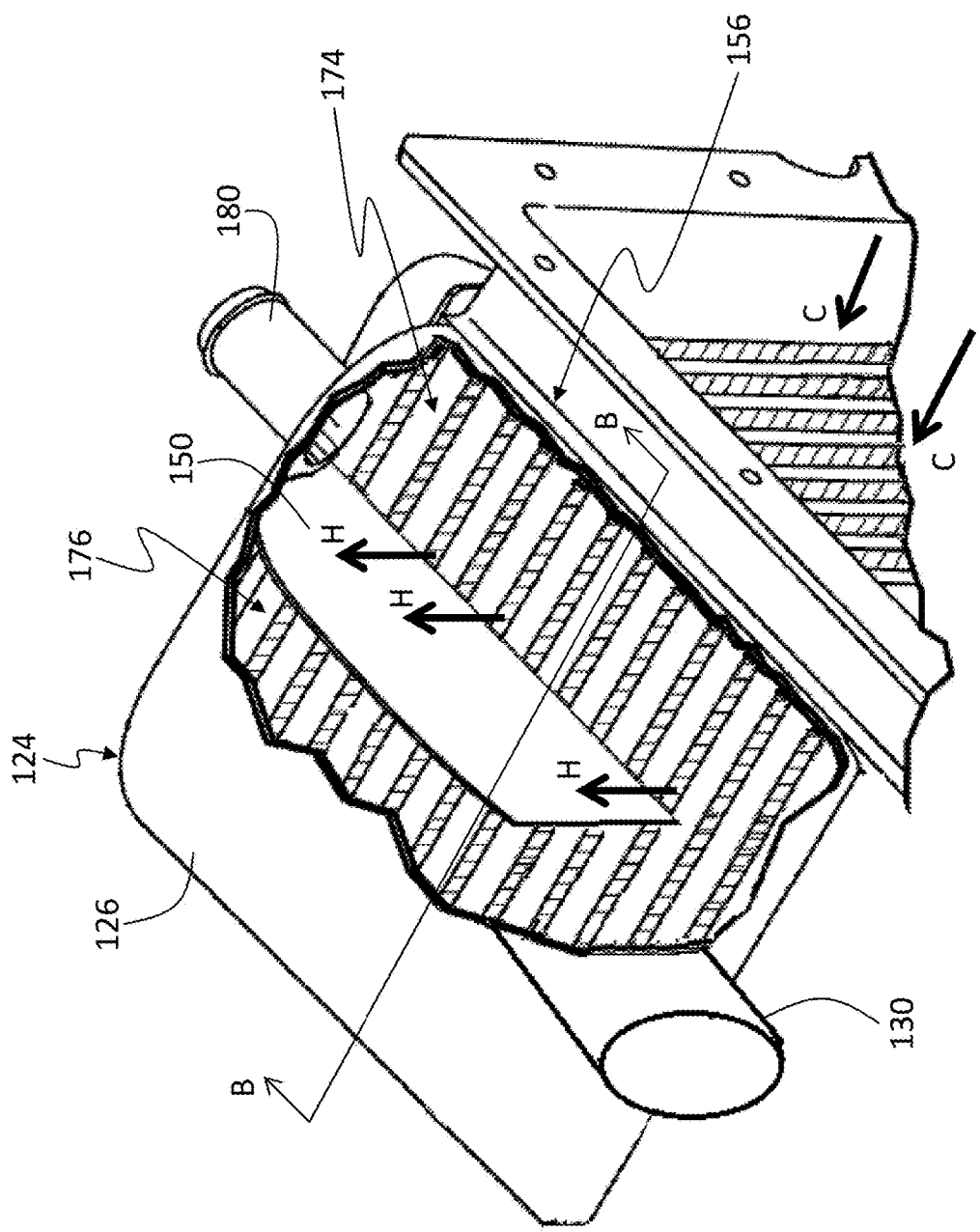
FIG. 5A is a perspective view of a header with a portion broken away to show a baffle in accordance with another embodiment of the present disclosure.
Figure 5B:
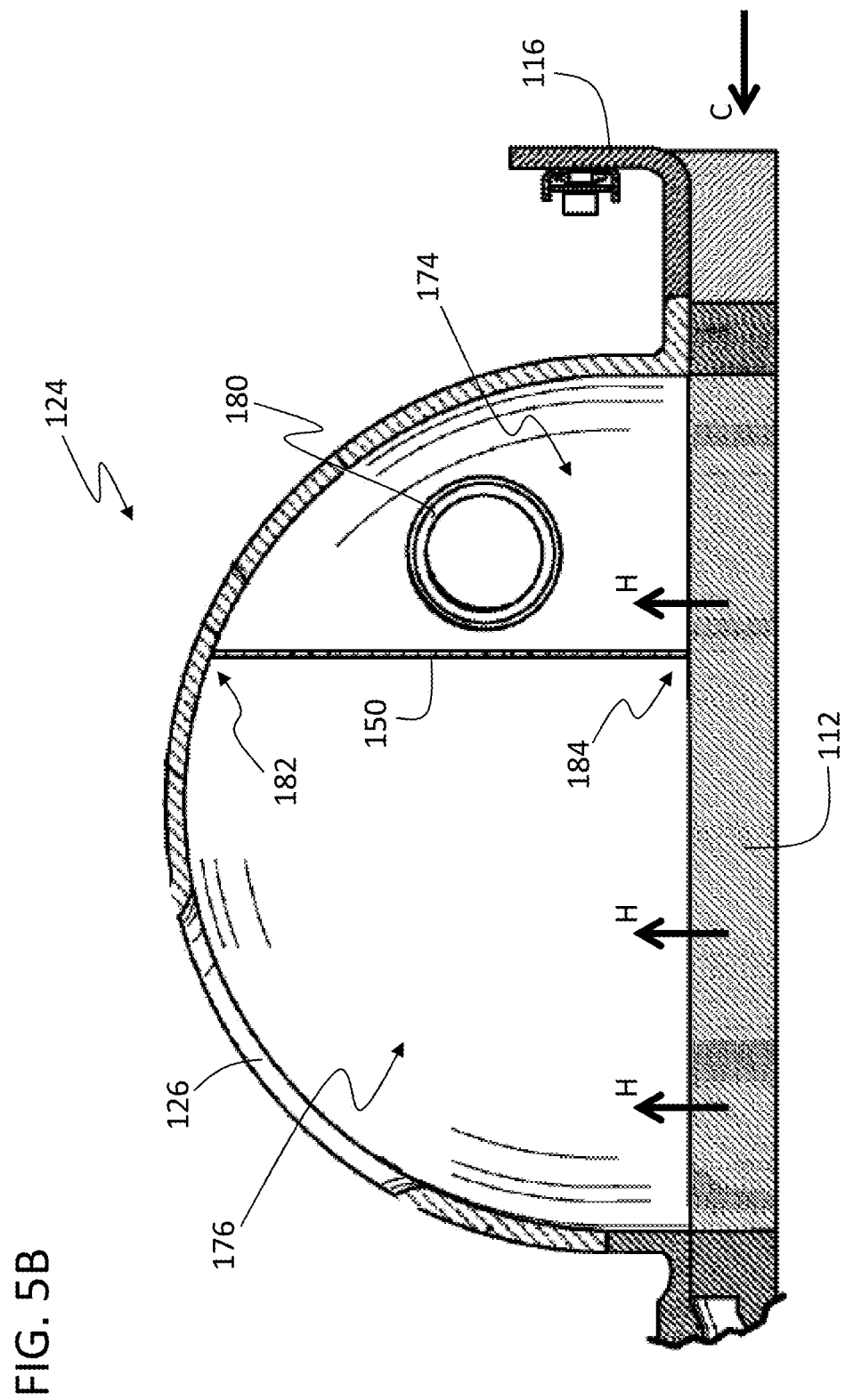
FIG. 5B is a cross-sectional view of the header of FIG. 5A along the line B-B.
Figure 5C:
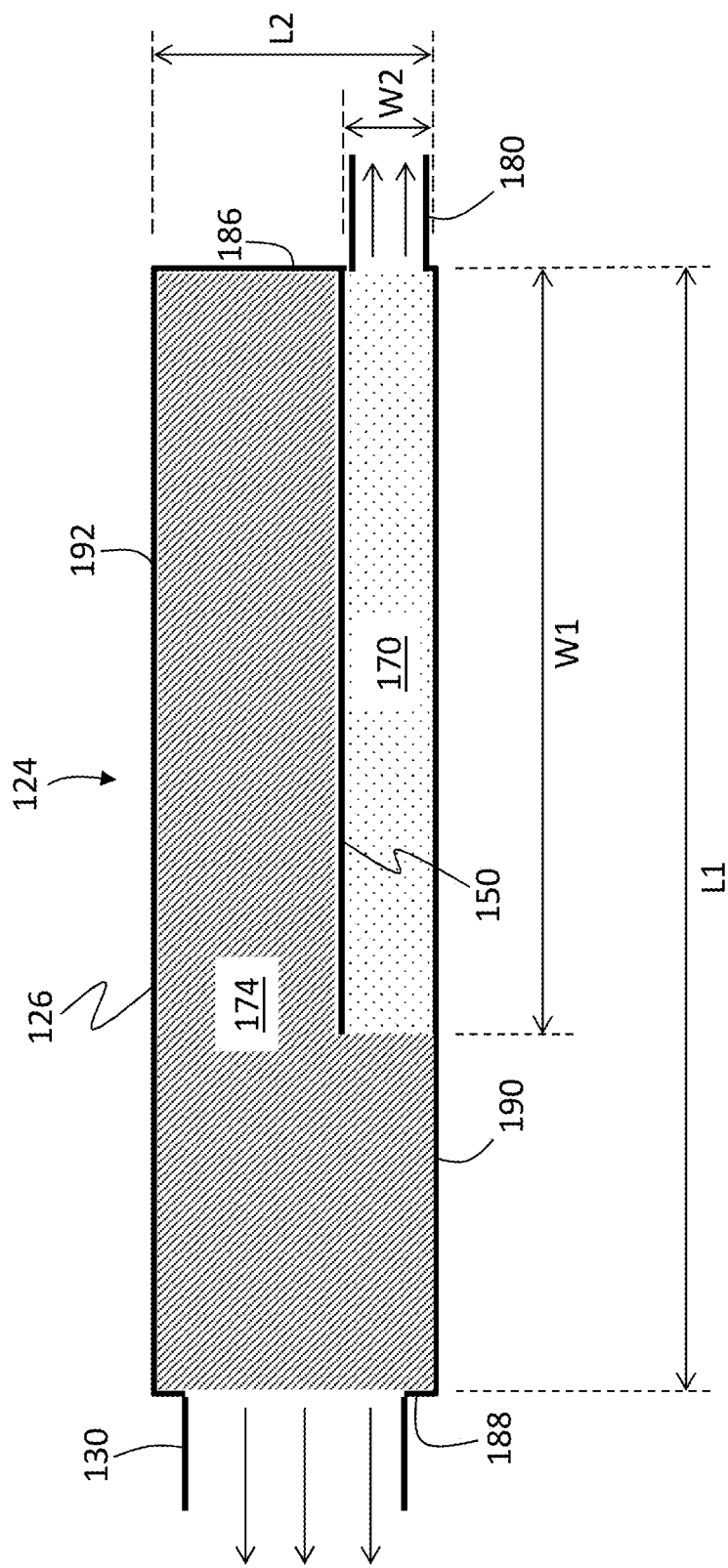
FIG. 5C is a plan view schematic illustration of the header of FIG. 5A.

Turning now to FIGS. 5A-5C, various schematic views of an alternative configuration of a header having baffle in accordance with an embodiment of the present disclosure are shown. FIG. 5A is a perspective schematic illustration of header configuration having a baffle that extends part way through the header and enables fluid communication between the first and second cavities. FIG. 5B is an end, cross-sectional view of the header of FIG. 5A (similar to the configuration of FIG. 4) and FIG. 5C is a plan view of the header of FIG. 5A.

The header 124 may be formed in part by a housing 126 that defines a header volume therein. The header 124 may also include baffle 150 therein. As shown, a heat exchanger outlet 130 may be formed at an alternative location of the housing 126 of the header 124. That is, as will be appreciated by those of skill in the art, the particular construction, structure, shape, size, etc. is not limited to the various drawings but rather these are provided for explanatory and illustrative purposes. At an opposing end of the housing 126 from the heat exchanger outlet 130 may be a bypass outlet 180. The bypass outlet 180 may be similar to the OBIGGS outlet 28 of the embodiments described above, although the bypass outlet 180 is not limited to such a configuration. For example, in some embodiments the bypass outlet 180 may be fluidly connected to an outlet of an air cycle machine and a bypass valve may be configured within a conduit or duct that fluidly connects the header 124. Thus, when the bypass valve is open, air may be directed through the bypass outlet 180 directly to an occupied compartment of an aircraft, i.e., bypassing the air cycle machine.

As shown, the baffle 150 may be configured to divide the header volume into at least a first cavity or volume 174 and a second cavity or volume 176, similar to that described above. The first volume 174 of the header 124 may be in direct fluid communication with the bypass outlet 180 and the second volume 176 may be in fluid communication with the heat exchanger outlet 130. When a bypass valve is open, all or a portion of the air in the first volume 174 may be forced through the bypass outlet 180 to be supplied to an occupied compartment, e.g., may bypass an air cycle machine, or may be supplied to another component of the aircraft. Further, as shown, the baffle 150 may not extend or divide the entire header 124, and thus the first volume 174 and the second volume 176 may be in direct communication and not substantially separated.

Because the first volume 174 and the second volume 176 may be in fluid communication, a portion of the second volume 176 may also be forced through the bypass outlet 180. As will be appreciated by those of skill in the art, the first volume 174 and the second volume 176 may collectively define the header volume.

In accordance with a non-limiting embodiment, when a bypass valve is closed, all air within the header 124 may flow toward and through the heat exchanger outlet 130. That is, air in the first volume 174 and air in the second volume 176 may flow toward the heat exchanger outlet 130 and be directed to a compressor or other component. No air may flow from the header 124 into and/or through the bypass outlet 180 when the bypass valve is closed. As such, when the bypass valve is closed, airflow is prevented from flowing through the bypass outlet 180.

However, when the bypass valve is opened, air in the first volume 174 may flow into and through the bypass flow path 180. At the same time, air in the second volume 176 may continue to flow from the header 124 toward and through the heat exchanger outlet 130. Thus, a portion of the air in the header 124 may be provided to the bypass outlet 180 and supplied to an occupied compartment of the aircraft or other component of the aircraft. The change in airflow within the header 124 may be achieved due to a low pressure (or pressure differential) being present when the bypass valve is opened. The pressure differential acts to force or pull air from the first volume 174 through the bypass outlet 180.

In some embodiments, the baffle 150 may be positioned to define the first volume 174 that contains a volume of cool or cold air within the header 124 at the cold-cold corner 156. The cold air may be supplied to an occupied compartment of the aircraft when the bypass valve is opened. In some embodiments, the baffle may be integrally formed with the header and/or with a heat exchanger core, or may be configured as a separate component that is installed into the header.

For example, with reference to FIG. 5B, in some non-limiting embodiments, the baffle 150 may be integrally formed at a baffle top end 182 with the housing 126. In other non-limiting embodiments, the baffle 150 may be integrally formed with the heat exchanger 112 (or the core thereof) at a baffle bottom end 184. In other embodiments, the baffle 150 may be fixed or attached to one or both of the housing 126 or the heat exchanger 112 by known mechanisms, including, but not limited to, adhesives, welding, fasteners, etc.

Further, as shown, the baffle 150 may span from the heat exchanger 112 at the baffle bottom end 184 to the housing 126 at the baffle top end 182. Accordingly, the baffle 150 may effectively divide the header volume of the header 124. Specifically, the baffle 150 may effectively partition the cold-cold corner and associated air flow from air that is near the cold-hot corner (as explained above).

Turning now to FIG. 5C, a plan schematic view of the header 124 is shown. The housing 126 of the header 124 may include or be defined by a first end wall 186 and a second end wall 188. As shown, the heat exchanger outlet 130 may be formed in the second end wall 188 and the bypass outlet 180 may be formed in the first end wall 186. Normal or perpendicular to the first and second end walls 186, 188 are a first side wall 190 and a second side wall 192. The end walls 186, 188 and the side walls 190, 192 are configured to define a volume of the header 124. Those of skill in the art will appreciate that the side walls 190, 192, in some configurations, may be formed from a single domed or curved structure (e.g., as shown in FIGS. 5A and 5B). As shown, the first end wall 186 and the second end wall 188 may be separated by a first length L1 which may define a length of the header 124. Further, the first side wall 190 and the second side wall 192 may be separated by a second length L2 which may define a width of the header 124.

The air entering the header 124 may be thermally stratified, such as described above. That is, colder air may enter the header 124 closer to the first side wall 190 (e.g., the cold-cold corner) and relatively warmer air may enter the header 124 closer to the second side wall 192 (e.g., the cold-hot corner). As described above, it may be advantageous to extract a portion of the colder air in the header 124 and direct the cold air to other components to provide cooling, conditioning, etc.

Accordingly, extending from the first end wall 186 toward the second end wall 188 is the baffle 150. The baffle 150 may extend a first distance W1 from the first end wall 186 toward the second end wall 188 along the length of the header 124. That is, the first distance W1 may be a length of the baffle 150. The baffle 150 may be positioned a second distance W2 from the first side wall 190 along the width of the header 124. The baffle 150 may extend vertically upward and downward within the header 124 (from the baffle bottom end 184 to the baffle top end 182) to define the first volume 174, and the remaining volume of the header 124 may be the second volume 176. Thus, the first volume 174 and the second volume 176 define or comprise a header volume.

As discussed above, a header configured with a baffle as provided herein may enable a portion of the volume of air within the header to be redirected or diverted and supplied to a component, e.g., an OBIGGS, etc., or bypass an air cycle machine, rather than being supplied to a compressor. The bypass outlet 180 may lead to a bypass duct that includes a bypass valve which may be opened and closed, and may be variable to provide a range of percentages open and/or closed. When the bypass valve is closed, all of the air within the header 124 may be directed and/or forced through the header outlet 130. That is, the air in the first volume 174 and the second volume 176 may both flow through the header outlet 130. However, when the bypass valve is opened, a pressure differential may force air from the first volume 174 through the bypass outlet 180 and supply the air into an occupied compartment of the aircraft or other component of the aircraft. At the same time, the air in the second volume 176 may continue to flow through the header outlet 130.

Because the first volume 174 and the second volume 176 are in direct fluid communication with each other in this configuration, and collectively define a volume of the header 124, some portion of either the first or second volumes 174, 176 may be directed through either of the header outlet 130 and the bypass flow path 180 when the bypass valve is open. That is, there are no specific cavities formed within the header 124 to maintain a separation of the first volume 174 from the second volume 176. Thus, those of skill in the art will appreciate that the indication of the first volume 174 and the second volume 176 is provided for illustrative purposes (e.g., in FIG. 5C).

The length and position of the baffle may be configured such that a desired first volume may be formed within the header. For example, the length and position may be configured to define a volume of the coldest air within the header, which may then be directed along the bypass flow path to aid in cooling air within an occupied compartment of the aircraft or cooling of another component of the aircraft. In some embodiments, the first distance W1 (i.e., the length of the baffle) may be a percentage of the first length L1 (i.e., the length of the header). In some embodiments, the first distance W1 may be equal to the first length L1 (e.g., as shown in the embodiment of FIG. 3), and in other embodiments the first distance W1 may be some percentage less than the first length L1 (e.g., as shown in the embodiment of FIGS. 5A-5C). Further, the second distance W2 (i.e., the position of the baffle relative to the first side wall) may be positioned at some point that is less than the second length L2 (i.e., the width of the header).

Further, although shown in FIGS. 5A-5C with the baffle 150 parallel to the side walls 190, 192, the present disclosure is not limited thereto. For example, the baffle may be angled toward or away from the first side wall. Further, the length and/or position of the baffle may be varied from that shown, such that in some embodiments, the first volume defined by the baffle may be larger or smaller, or have a different geometry, than that shown in the various described embodiments. Accordingly, the size, shape, length, and position of the baffle may be configured as desired to provide a specific or defined first volume that may be provided to supply an occupied compartment of the aircraft or other component with air from the heat exchanger, and, in some embodiments, from a cold-cold corner of a heat exchanger.

In some embodiments, by employing a baffle as described herein, a large portion or percentage of the air within a heat exchanger header may be diverted and/or supplied to different components at desired times. For example, by employing a bypass valve and a baffle as shown in FIGS. 5A-5C anywhere from 0% to 60% of the total air within the header may be directed through a bypass outlet. Further, such configuration may minimize or eliminate pressure drops when forcing or pulling air to another location within the system, e.g., when directing air to an occupied compartment of the aircraft.

Advantageously, baffles provided herein may be used to divide a volume in a heat exchange header such that a portion of the air within the header may be extracted and supplied to a desired location. For example, advantageously, cool or cold air may be partitioned within a header using a baffle and drawn off/extracted therefrom enabling use of the cold air to cool and mix with air within an occupied compartment of the aircraft.

Further, advantageously, a baffle and cold-corner tap as provided herein may be experienced in terms of heat exchanger weight, ram air flow, and/or bleed pressure. In a conventional approach, a primary heat exchanger outlet may be received by an ACM bypass. The temperature of the air is a bulk average temperature. The cold corner tap approach captures the air closest to the cold side inlet (e.g., cold-cold corner) and directs this air through the bypass outlet and to an occupied compartment of the aircraft or to some other component of the aircraft. The colder air supplied through the bypass outlet into an occupied compartment of the aircraft may reduce the amount of ram air that is required by the system, may make the heat exchanger smaller, and/or may allow bleed pressures to be lower because the system does require as much expansion across a turbine.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

For example, although shown and described with a specific heat exchange system configured, e.g., dual primary and secondary heat exchangers, those of skill in the art will appreciate that baffles as provided herein may be installed and/or manufactured with various types of heat exchangers, and may be installed in inlet and/or outlet headers and/or on primary or secondary heat exchangers. Furthermore, although shown with the baffle positioned within a primary heat exchanger outlet side, those of skill in the art will appreciate that baffles may be configured within any header of any heat exchanger. For example, a baffle may be positioned within an inlet side of a heat exchanger. Similarly, a baffle may be provided in a secondary heat exchanger.

Accordingly, the invention is not to be seen as limited by the foregoing description, but is only limited by the scope of the appended claims.

What is claimed is:

1. A heat exchanger for an aircraft comprising:
    a hot fluid inlet;
    a hot fluid outlet;
    a cold fluid inlet;
    a cold fluid outlet; and
    a header connected to the hot fluid outlet, the header comprising:
        a housing defining a header volume; and
        a baffle located within the housing and separating the header volume into a first volume and a second volume, wherein the first volume and the second volume are in fluid communication with each other,
        wherein the housing has a first end wall and a second end wall and a housing length defined between the first end wall and the second end wall, wherein the baffle extends from the first end toward the second end with a length of the baffle being less than the housing length,
        the header further comprising a bypass outlet in fluid communication with the first volume,
        a heat exchanger outlet, the heat exchanger outlet located in the housing opposite the bypass outlet, and
        a bypass valve configured to control fluid flow through the bypass outlet, such that:
            when the bypass valve is closed, no air can flow through the bypass outlet, and all air in the header volume will flow through the heat exchanger outlet, and
            when the bypass valve is open, air from the first volume can flow into and through the bypass outlet, and air within the second volume will flow through the heat exchanger outlet,
            wherein the bypass valve and baffle are arranged such that when the bypass valve is open a volume of air comprising 0% to 60% of a total air within the header volume will flow through the bypass outlet.

2. The heat exchanger of claim 1, wherein the baffle extends from the hot fluid outlet to a top of the housing.

3. The heat exchanger of claim 1, wherein the baffle is positioned parallel with the first side wall.

4. The heat exchanger of claim 1, wherein the baffle extends at an angle relative to the first side wall.

5. The heat exchanger of claim 1, wherein the baffle is integrally formed with the housing.

6. A method of making a heat exchanger for an aircraft, the method comprising:
    connecting a header to a heat exchanger having a hot fluid inlet, a hot fluid outlet, a cold fluid inlet, and a cold fluid outlet, the header connected to the hot fluid outlet, the header comprising:
        a housing defining a header volume; and
        a baffle located within the housing and separating the header volume into a first volume and a second volume, wherein the first volume and the second volume are in fluid communication with each other
        wherein the housing has a first end wall and a second end wall and a housing length defined between the first end wall and the second end wall, wherein the baffle extends from the first end toward the second end with a length of the baffle being less than the housing length,
        the header further comprising a bypass outlet in fluid communication with the first volume,
        a heat exchanger outlet, the heat exchanger outlet located in the housing opposite the bypass outlet, and
        a bypass valve configured to control fluid flow through the bypass outlet, such that:
            when the bypass valve is closed, no air can flow through the bypass outlet, and all air in the header volume will flow through the heat exchanger outlet, and
            when the bypass valve is open, air from the first volume can flow into and through the bypass outlet, and air within the second volume will flow through the heat exchanger outlet,
            wherein the bypass valve and baffle are arranged such that when the bypass valve is open a volume of air comprising 0% to 60% of a total air within the header volume will flow through the bypass outlet.

7. The method of claim 6, wherein the baffle extends from the hot fluid outlet to a top of the housing.

8. The method of claim 6, wherein the baffle is positioned parallel with the first side wall.

9. The method of claim 6, wherein the baffle extends at an angle relative to the first side wall.

10. The method of claim 6, wherein the baffle is integrally formed with the housing.

\* \* \* \* \*